May 12, 1964  G. M. FOX  3,132,682
TRACTION AIDS FOR AUTOMOTIVE VEHICLES
Filed March 4, 1963

INVENTOR

George M. Fox.

3,132,682
TRACTION AIDS FOR AUTOMOTIVE VEHICLES
George M. Fox, 365 Parkview Drive, St. Albans, W. Va.
Filed Mar. 4, 1963, Ser. No. 262,634
2 Claims. (Cl. 152—216)

This invention relates to a new concept of an apparatus having general utility for providing improved traction for the tires of automotive vehicles, in particular on mud, snow, and ice surfaces.

In the past there have been developed different types of apparatuses to provide additional traction for vehicle tires on mud, snow, and ice surfaces. The most common efficient device in use today is the conventional tire chain or some variation thereof, installation and removal of which is not only difficult and time consuming, but also distasteful because of necessity for reaching over or around the tire for placement and the association with mud, snow, ice, or water encountered in such operations. Other types of apparatuses designed to overcome such difficulties have not proven commercially successful as evidenced by their absence on the market today.

There is need for an efficient traction aid designed for more simple installation and removal in all cases, and especially in adverse and emergency situations when the time and trouble involved to install existing apparatuses on the market is out of proportion to the immediate need. I have reference to such cases as need of more traction on mud, snow, or ice surfaces generally associated with inclined driveways, inclined bridges, and hills after rain, snow, or freezes, and for other similar situations wherein the need for more traction is for short duration, and where continued traction aid is unnecessary after the immediate difficulty has been surmounted.

It is accordingly an object of the present invention to provide a novel type of apparatus which is capable of providing traction aid for automotive vehicle tires comparable to or better than existing apparatuses for this purpose on the market today. A further object is to provide such apparatus, constructed in a manner designed to facilitate installation and removal under adverse or emergency conditions, which eliminates difficulty and distastefulness associated with installation and removal of existing apparatuses on the market today, and which embodies a new principle for construction of traction aids for vehicle tires.

The invention is based upon a novel concept of traction aids for vehicle tires in which a specially constructed device is attached to an inner perimeter of the recessed portion of vehicle wheels in most common use today, and serves as a preplaced device for connection of other units which extend, from this point, radially over and partially around an outer area of the tire perpendicular to the periphery of the tire, the surface contacting area of which is provided with corrugation, cleats, or other traction aiding arrangements. The device attached to the wheel is detachably secured by means of standardized present vehicle equipment and is sized to fit under the wheel cover when in place. The units that partially surround the tire are designed for quick and easy hand connection to the common wheel device and constructed in such a manner as to provide both rigidness and flexibility as needed to insure a firm connection without permitting undue stress on the apparatus. The device attached to the wheel turns with the wheel and the one or more connected units partially surrounding the tire are caused to rotate. Additional traction is provided for by the rotating radial units.

The above and other features and objects of the present invention will be better understood by reference to the accompanying drawings of typical embodiments of the invention in which.

Figure 1:
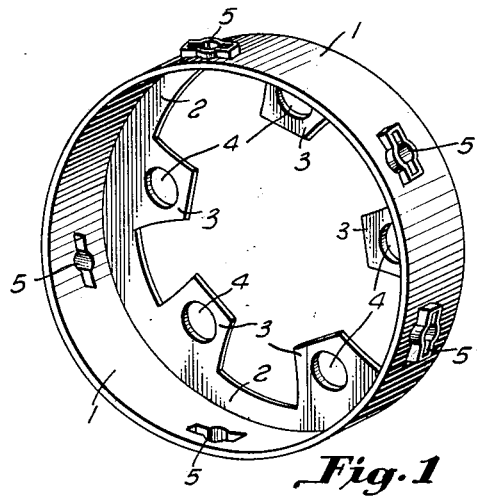
FIGURE 1 represents a three quarter elevational view of a common device that attaches to the vehicle wheel and which hereinafter will be called the common wheel bracket.

Referring to FIGURE 1, the illustrated common wheel bracket shows a circular band 1, of cylindrical form joined to a circular rim 2, which is provided with projections 3. The rim projections 3, are provided with apertures 4, positioned to fit around the vehicle wheel bolts and sized and tapered to fit over the rear tapered portion of the wheel nut to allow both the wheel and the common wheel bracket to be secured to the wheel bolt by the same wheel nut at each point. The walls of the circular band 1, are provided with traction unit connectors 5, which extend through the band wall both inward and outward and are spaced at intervals around the band 1. The traction unit connectors 5, are constructed in rectangular form generally, with the center portion thereof fashioned in circular form.

Figure 2:
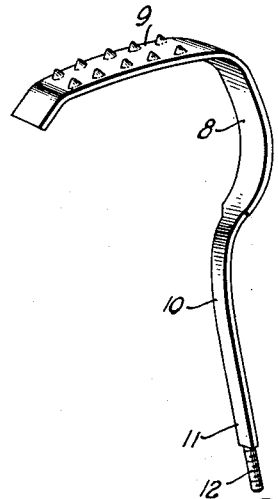
FIGURES 2 and 2a represent a three quarter and a side elevational view, respectively, of the device which partially surrounds the vehicle tire and connects to the bracket, which hereinafter will be called the traction unit.
Figure 2A:

Referring to FIGURE 2, the illustrated traction unit shows a curved section 8, shaped to fit over and partially around an outer area of the tire perpendicular to the periphery thereof, the surface contacting area 9, of which is provided with cleat like protrusions. The center section 10, of the traction unit, one end of which joins with the curved section 8, is of bar form, shaped for approximate continuity with the contour of the vehicle wheel, and sized and shaped on the opposite end 11, to fit snugly through the rectangular shaped portion of the traction unit connector 5, to a distance of approximately one half way through. This end 11, of the bar like section of the traction unit joins with a threaded rod 12, sized in diameter to fit snugly through the circular portion of the traction unit connector 5, and sized in length to extend through and beyond the inner side for reception of a connecting nut 13, which is constructed for hand turning and tapered to fit neatly into the inner circular portion of the traction unit connector when tightened against it.

Figure 3:
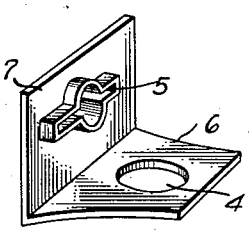
FIGURE 3 represents a three quarter elevational view of a separate device that attaches to the vehicle wheel and which hereinafter will be called the separate wheel bracket.

Referring to FIGURE 3, the illustrated separate wheel bracket shows a right angular shaped bracket one segment 6, of which is provided with an aperture 4, identical with and for the same purpose as described in FIGURE 1. The other segment 7, is provided with a traction unit connector 5, also identical with and for the same purpose as described in FIGURE 1.

Figure 4:
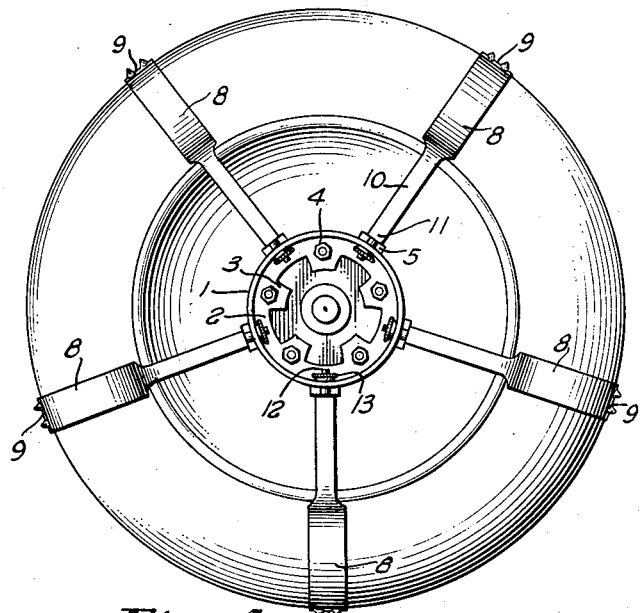
FIGURE 4 represents a side elevational view of the complete apparatus in place on a vehicle wheel and tire.

Referring to FIGURE 4, the illustration suggests a general undetailed view of a complete apparatus, utilizing the common wheel bracket, in place on a vehicle wheel and tire.

In a typical embodiment of the invention, utilizing the common wheel bracket, the wheel nuts are removed and the band rim 2, is positioned against the wheel in such a manner that the wheel bolts fit through the apertures 4, in the band rim projections 3. The wheel nuts are then replaced on the wheel bolts and serve to secure the wheel to the vehicle and the bracket to the wheel in a unified manner.

The curved section of the traction unit 8, is placed over the tread surface of the tire and the unit as a whole positioned in such a manner that the threaded rod 12, passes through the circular portion of the traction unit connector 5, and a following portion of the bar shaped center section 11, fits into the rectangle shaped portion of the traction unit connector. The tapered side of the connecting nut 13, is attached to the threaded rod 12, and hand tightened against the inner circular portion of the traction unit connector 5, which connects the traction unit to the wheel bracket band in a snug and secure manner.

The common bracket and the separate brackets are designed of such width that wheel covers most widely in use today can be placed back on the vehicle wheel with the brackets in place. Accordingly, the brackets can be preinstalled and left in place under the wheel cover. Under any conditions then, all that is necessary to obtain additional traction aid is to remove the wheel cover and connect traction units to the preplaced wheel brackets in the simple manner as described. Removal of the traction units is accomplished in a similar easy manner. Installation and removal difficulties are further decreased in many instances because of the feature which permits installation of only that number of separate traction units necessary to overcome the immediate situation.

From the foregoing drawings and description it will be apparent that I have provided an efficient traction aiding device of simple construction, one part of which is adaptable to being preinstalled on present types of vehicle wheels by means of standardized present vehicle equipment, the other part of which is adaptable for quick and easy one step hand connection to the preinstalled part in a manner that prevents twisting or turning in a sideways, or forward or backward, direction, but which allows flexibility in a radial direction to relieve stress and strain on the apparatus as a whole that would occur on surface contact with rigid devices.

Many modifications and variations in the apparatus may be employed without deviating from the broader aspects of the invention.

I claim as my invention:

1. An apparatus having general utility for providing improved traction for a vehicle tire equipped wheel comprising as one part; a common one piece wheel bracket adapted to be attached to a vehicle tire equipped wheel having a recessed portion therein, at an inner perimeter thereof, said bracket including a circular band adapted to be contiguously disposed alongside the vehicle tire equipped wheel at said inner perimeter of the recessed portion thereof, a plurality of radially positioned projections extending from said band, said projections adapted to be disposed over the vehicle tire equipped wheel bolt apertures in the vehicle tire equipped wheel and provided with apertures, said apertures positioned to align with the vehicle tire equipped wheel bolt apertures and being concavely tapered on their outer sides to permit sufficient exposure of the vehicle tire equipped wheel bolts to allow for attachment of standardized convexly tapered vehicle tire equipped wheel nuts whereby both the vehicle tire equipped wheel and bracket are adapted to be secured to a vehicle, a plurality of traction unit connectors spaced around the surface of the band intermediate the edges of said band and peripherally positioned between the vehicle tire equipped wheel attaching projections, said connectors extending radially through the surface of said band and being provided with apertures which are constructed in rectangular form generally with the center portion thereof fashioned in circular form; one or more one piece traction units of which one section of each is adapted to be generally radially disposed alongside the vehicle tire equipped wheel rim, another section being adapted to be generally radially disposed alongside the outer vehicle tire equipped wheel side wall and which is adapted to extend transversely horizontally across the vehicle tire equipped wheel tread portion, said transverse horizontal portion being provided with traction aiding arrangements on the surface adapted to engage the surface engaged by the vehicle tire equipped wheel tread, another straight bar-like shank portion to which a threaded bolt is attached and which is adapted to extend radially inwardly perpendicular to the section which is adapted to extend transversely across the vehicle tire equipped wheel tread and in alignment with the apertures in the traction unit connectors on the common vehicle tire equipped wheel bracket, said connector apertures being of radial depth and size to snugly unbindingly reciprocally receive the bar-like shank and threaded bolt ends of the traction units, said bar-like shanks extending partially through said connector apertures and part of said threaded bolts extending radially inwardly from the inner extremities of said connector apertures for reception of connecting nuts, said connecting nuts being designed for hand turning and for tightening against the inner extremities of the traction unit connectors to produce firm engagement of the traction units with the vehicle tire equipped wheel tread and in cooperation with said traction unit connectors retain said traction units against lateral or longitudinal displacement while allowing radial movement thereof to absorb shock encountered by road surface contact.

2. An apparatus having general utility for providing improved traction for a vehicle tire equipped wheel comprising as one part; a separate one piece wheel bracket adapted to be attached to a vehicle tire equipped wheel having a recessed portion therein, at an inner section thereof, said bracket including a segment adapted to be contiguously disposed alongside the vehicle tire equipped wheel at said inner section of the recessed portion thereof, a radially positioned projection extending from said segment, said projection adapted to be disposed over a vehicle tire equipped wheel bolt aperture in the vehicle tire equipped wheel and provided with an aperture, said aperture positioned to align with the vehicle tire equipped wheel bolt aperture and being concavely tapered on the outer side to permit sufficient exposure of the vehicle tire equipped wheel bolt to allow for attachment of a standardized convexly tapered vehicle tire equipped wheel nut whereby both the vehicle tire equipped wheel and bracket are adapted to be secured to a vehicle, a traction unit connector positioned on the surface of the segment intermediate the edges of said segment, said connector extending radially through the surface of said segment and being provided with an aperture which is constructed in rectangular form generally with the center portion thereof fashioned in circular form; a one piece traction unit of which one section is adapted to be generally radially disposed alongside the vehicle tire equipped wheel rim, another section being adapted to be generally radially disposed alongside the outer vehicle tire equipped wheel side wall and which is adapted to extend transversely horizontally across the vehicle tire equipped wheel tread portion, said transverse horizontal portion being provided with traction aiding arrangements on the surface adapted to engage the surface engaged by the vehicle tire equipped wheel tread, another straight bar-like shank section to which a threaded bolt is attached and which is adapted to extend radially inwardly perpendicular to the section which is adapted to extend transversely across the vehicle tire equipped wheel tread and in alignment with the aperture in the traction unit connector on the separate vehicle tire equipped wheel bracket, said connector aperture being of radial depth and size to snugly unbindingly reciprocally receive the bar-like shank and threaded bolt end of the traction unit, said bar-like shank extending partially through said connector aperture and part of said threaded bolt extending radially inwardly from the inner extremities of said connector aperture for reception of a connecting nut, said connecting nut being designed for hand turning and for tightening against the inner extremities of the traction unit connector to produce firm engagement of the traction unit with the vehicle tire equipped wheel tread and in cooperation with said traction unit connector retain said traction unit against lateral or longitudinal displacement while allowing radial movement thereof to absorb shock encountered by road surface contact.

References Cited in the file of this patent

UNITED STATES PATENTS

| | | |
|---|---|---|
| 1,540,470 | Hayden | June 2, 1925 |
| 2,198,906 | Conway | Apr. 30, 1940 |
| 3,045,738 | Lombardi | July 24, 1962 |

FOREIGN PATENTS

| | | |
|---|---|---|
| 559,291 | Italy | Mar. 16, 1957 |